US012536275B2

(12) United States Patent
C M

(10) Patent No.: US 12,536,275 B2
(45) Date of Patent: Jan. 27, 2026

(54) SYSTEM FOR DETECTION OF UNAUTHORIZED COMPUTER CODE USING AN ARTIFICIAL INTELLIGENCE-BASED ANALYZER

(71) Applicant: BANK OF AMERICA CORPORATION, Charlotte, NC (US)

(72) Inventor: Manoj Kumar C M, Chennai (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 134 days.

(21) Appl. No.: 18/504,386

(22) Filed: Nov. 8, 2023

(65) Prior Publication Data

US 2025/0148072 A1    May 8, 2025

(51) Int. Cl.
*G06F 21/54* (2013.01)
*G06F 21/55* (2013.01)
*G06F 21/56* (2013.01)

(52) U.S. Cl.
CPC ............ *G06F 21/54* (2013.01); *G06F 21/552* (2013.01); *G06F 21/566* (2013.01)

(58) Field of Classification Search
CPC ....... G06F 21/54; G06F 21/552; G06F 21/566
See application file for complete search history.

(56) References Cited

U.S. PATENT DOCUMENTS

| 8,370,362 B2 | 2/2013 | Szabo |
| 8,560,282 B2 | 10/2013 | Macready |

(Continued)

FOREIGN PATENT DOCUMENTS

| CA | 2795766 C | 10/2017 |
| CN | 104581630 A | 4/2015 |

(Continued)

OTHER PUBLICATIONS

R. Ashok Kumar • Shaik Ishrat • Mallela Durga Prasad • Poona Abubakar Siddiq • N C Hari Shankar; AI-Driven Detection Mechanism for UPI Fraud and QR Code Tampering; 2025 6th International Conference on Intelligent Communication Technologies and Virtual Mobile Networks (ICICV) (2025, pp. 877-883); (Year: 2025).*

(Continued)

*Primary Examiner* — Luu T Pham
*Assistant Examiner* — Chao Wang
(74) *Attorney, Agent, or Firm* — Moore & Van Allen PLLC; Nicholas C. Russell

(57) ABSTRACT

A system is provided for detection of unauthorized computer code using an artificial intelligence-based analyzer. The system may include an artificial intelligence-based analyzer configured to receive various data and metadata from a user computing device when the user computing device is used to capture a scannable code using an image capture device. The system may, using the AI-based engine, compare the scanned code with a pool or repository of previously scanned code to determine whether the code has been scanned before. The repository may further comprise various types of metadata regarding the scanned code, such as success rate, usual scanning location, embedded resources or links within the code, timestamps for when the code was previously scanned, and/or the like. Based on the analysis of the scanned code, the system may present a notification on the user computing device that indicates whether the scanned code is potentially unsafe to execute.

18 Claims, 5 Drawing Sheets

(56) References Cited

U.S. PATENT DOCUMENTS

| | | |
|---|---|---|
| 8,613,096 B2 | 12/2013 | Peinado |
| 9,332,028 B2 | 5/2016 | Xaypanya |
| 9,357,411 B2 | 5/2016 | Sridhara |
| 9,594,993 B2 | 3/2017 | Picard |
| 9,626,680 B1 | 4/2017 | Ryan |
| 9,836,617 B2 | 12/2017 | Cecchetti |
| 10,296,794 B2 | 5/2019 | Ratti |
| 10,476,898 B2 | 11/2019 | Muddu |
| 10,956,477 B1 | 3/2021 | Fang |
| 10,970,387 B2 | 4/2021 | Aguayo Gonzalez |
| 11,005,882 B1 * | 5/2021 | Song .................. G06Q 20/4016 |
| 11,100,418 B2 | 8/2021 | Bunyk |
| 11,487,903 B2 | 11/2022 | Schroeder |
| 2018/0260245 A1 | 9/2018 | Smith |
| 2019/0066089 A1 | 2/2019 | Miryala |
| 2021/0273957 A1 | 9/2021 | Boyer |
| 2023/0152598 A1 * | 5/2023 | Brebner ............. G02B 27/0977 359/627 |
| 2024/0070261 A1 * | 2/2024 | Bin Huraib ........... G06F 21/566 |

FOREIGN PATENT DOCUMENTS

| | | | |
|---|---|---|---|
| CN | 105825257 A | 8/2016 | |
| CN | 113591636 A * | 11/2021 | ............. G06N 3/044 |
| CN | 109214224 B * | 5/2022 | ....... G06K 19/06037 |
| EP | 2364485 B1 | 9/2019 | |

OTHER PUBLICATIONS

Siam Shibly Antar • Philippe Charland • Steven H. H. Ding • Benjamin C. M. Fung; Vulnerability Patch Verification for Military Software Systems Through AI-Driven Code-Level Rule Generation; 2025 17th International Conference on Cyber Conflict: The Next Step (CyCon) (2025, pp. 189-208); (Year: 2025).*

Fahad Mira; An investigation of malware and the systems used to detect and identify malware; 2024 IEEE 7th International Conference on Advanced Technologies, Signal and Image Processing (ATSIP) (vol. 1, 2024, pp. 1-8); (Year: 2024).*

* cited by examiner

SYSTEM FOR DETECTION OF UNAUTHORIZED COMPUTER CODE USING AN ARTIFICIAL INTELLIGENCE-BASED ANALYZER

TECHNOLOGICAL FIELD

Example embodiments of the present disclosure relate to a system for detection of unauthorized computer code using an artificial intelligence-based analyzer.

BACKGROUND

There is a need for a secure, reliable way to detect potentially unauthorized code.

BRIEF SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

A system is provided for detection of unauthorized computer code using an artificial intelligence-based analyzer. In particular, the system may include an artificial intelligence-based engine or module that may be configured to receive various data and/or metadata from a user computing device when the user computing device is used to execute certain functions, such as capturing a scannable code using an image capture device. The system may, using the AI-based engine, compare the scanned code with a pool or repository of previously scanned code to determine whether the code has been scanned before. The repository may further comprise various types of metadata regarding the scanned code, such as success rate, usual scanning location, embedded resources or links within the code, timestamps for when the code was previously scanned, and/or the like. Based on the analysis of the scanned code, the system may present a notification on the user computing device that indicates whether the scanned code is potentially unsafe to execute. In this way, the system may provide a way to proactively prevent users from executing unauthorized code.

Accordingly, embodiments of the present disclosure provide a system for detection of unauthorized computer code using an artificial intelligence-based analyzer, the system comprising a processing device; a non-transitory storage device containing instructions when executed by the processing device, causes the processing device to perform the steps of detecting that a user computing device has scanned a scannable code; receiving, from the user computing device, data and metadata associated with the scannable code; processing the data and metadata using an artificial intelligence analyzer, wherein processing the data and metadata comprises comparing the scannable code to one or more entries in a historical scannable code repository; based on processing the data and metadata, determining whether the scannable code matches an entry of the one or more entries in the historical scannable code repository; and presenting a notification on the user computing device, the notification indicating whether the scannable code is safe to execute.

In some embodiments, processing the data and metadata further comprises executing a bit-wise matrix conversion of the scannable code using a convolutional neural network to generate a scannable code matrix; and executing a local search of the historical scannable code repository based on the scannable code matrix using an iterative deepening depth first search algorithm.

In some embodiments, processing the data and metadata further comprises identifying one or more parameters from the metadata; and executing a global search of the historical scannable code repository based on the one or more parameters using a simulated annealing process.

In some embodiments, the one or more parameters comprises location data of the user computing device and a timestamp indicating when the user computing device scanned the scannable code.

In some embodiments, processing the data and metadata further comprises computing a confidence score associated with the scannable code, wherein the confidence score is computed based on one or more factors, the one or more factors comprising at least one of a usual location associated with the scannable code, an entity name or identifier associated with the scannable code, and an access frequency or pattern associated with the scannable code.

In some embodiments, processing the data and metadata comprises determining that the scannable code is unsafe to execute; and automatically blocking the execution of the scannable code on the user computing device.

In some embodiments, processing the data and metadata comprises determining that the scannable code is safe to execute; and wherein the notification comprises a visual indicator indicating that the scannable code is safe to execute.

Embodiments of the present disclosure also provide a computer program product for detection of unauthorized computer code using an artificial intelligence-based analyzer, the computer program product comprising a non-transitory computer-readable medium comprising code causing an apparatus to perform the steps of detecting that a user computing device has scanned a scannable code; receiving, from the user computing device, data and metadata associated with the scannable code; processing the data and metadata using an artificial intelligence analyzer, wherein processing the data and metadata comprises comparing the scannable code to one or more entries in a historical scannable code repository; based on processing the data and metadata, determining whether the scannable code matches an entry of the one or more entries in the historical scannable code repository; and presenting a notification on the user computing device, the notification indicating whether the scannable code is safe to execute.

In some embodiments, processing the data and metadata further comprises executing a bit-wise matrix conversion of the scannable code using a convolutional neural network to generate a scannable code matrix; and executing a local search of the historical scannable code repository based on the scannable code matrix using an iterative deepening depth first search algorithm.

In some embodiments, processing the data and metadata further comprises identifying one or more parameters from the metadata; and executing a global search of the historical scannable code repository based on the one or more parameters using a simulated annealing process.

In some embodiments, the one or more parameters comprises location data of the user computing device and a timestamp indicating when the user computing device scanned the scannable code.

In some embodiments, processing the data and metadata further comprises computing a confidence score associated with the scannable code, wherein the confidence score is computed based on one or more factors, the one or more factors comprising at least one of a usual location associated with the scannable code, an entity name or identifier associated with the scannable code, and an access frequency or pattern associated with the scannable code.

In some embodiments, processing the data and metadata comprises determining that the scannable code is unsafe to execute; and automatically blocking the execution of the scannable code on the user computing device.

Embodiments of the present disclosure also provide a computer-implemented method for detection of unauthorized computer code using an artificial intelligence-based analyzer, the computer-implemented method comprising detecting that a user computing device has scanned a scannable code; receiving, from the user computing device, data and metadata associated with the scannable code; processing the data and metadata using an artificial intelligence analyzer, wherein processing the data and metadata comprises comparing the scannable code to one or more entries in a historical scannable code repository; based on processing the data and metadata, determining whether the scannable code matches an entry of the one or more entries in the historical scannable code repository; and presenting a notification on the user computing device, the notification indicating whether the scannable code is safe to execute.

In some embodiments, processing the data and metadata further comprises executing a bit-wise matrix conversion of the scannable code using a convolutional neural network to generate a scannable code matrix; and executing a local search of the historical scannable code repository based on the scannable code matrix using an iterative deepening depth first search algorithm.

In some embodiments, processing the data and metadata further comprises identifying one or more parameters from the metadata; and executing a global search of the historical scannable code repository based on the one or more parameters using a simulated annealing process.

In some embodiments, the one or more parameters comprises location data of the user computing device and a timestamp indicating when the user computing device scanned the scannable code.

In some embodiments, processing the data and metadata further comprises computing a confidence score associated with the scannable code, wherein the confidence score is computed based on one or more factors, the one or more factors comprising at least one of a usual location associated with the scannable code, an entity name or identifier associated with the scannable code, and an access frequency or pattern associated with the scannable code.

In some embodiments, processing the data and metadata comprises determining that the scannable code is unsafe to execute; and automatically blocking the execution of the scannable code on the user computing device.

In some embodiments, processing the data and metadata comprises determining that the scannable code is safe to execute; and wherein the notification comprises a visual indicator indicating that the scannable code is safe to execute.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having thus described embodiments of the disclosure in general terms, reference will now be made the accompanying drawings. The components illustrated in the figures may or may not be present in certain embodiments described herein. Some embodiments may include fewer (or more) components than those shown in the figures.

Figure 1A:
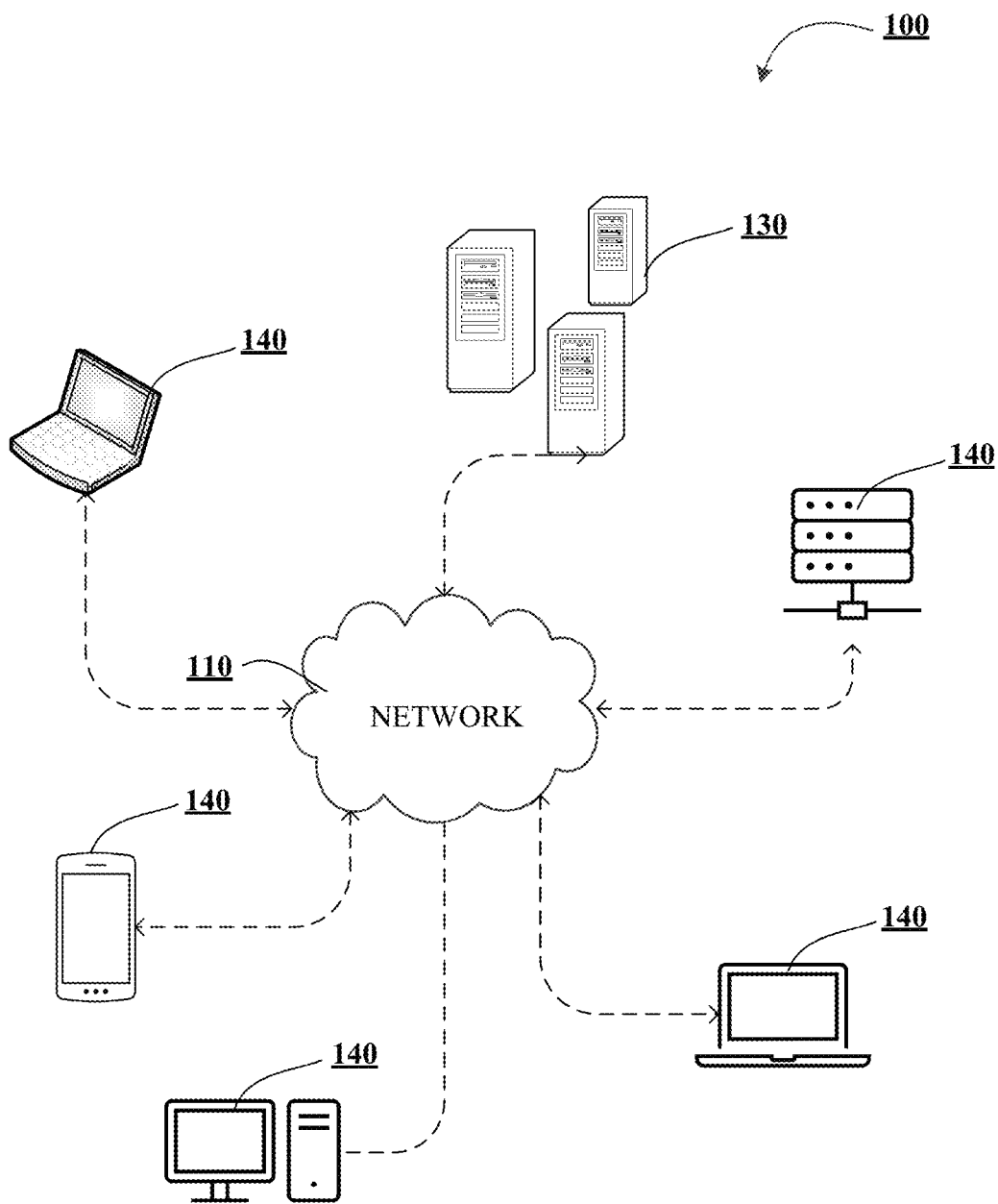
Figure 1B:
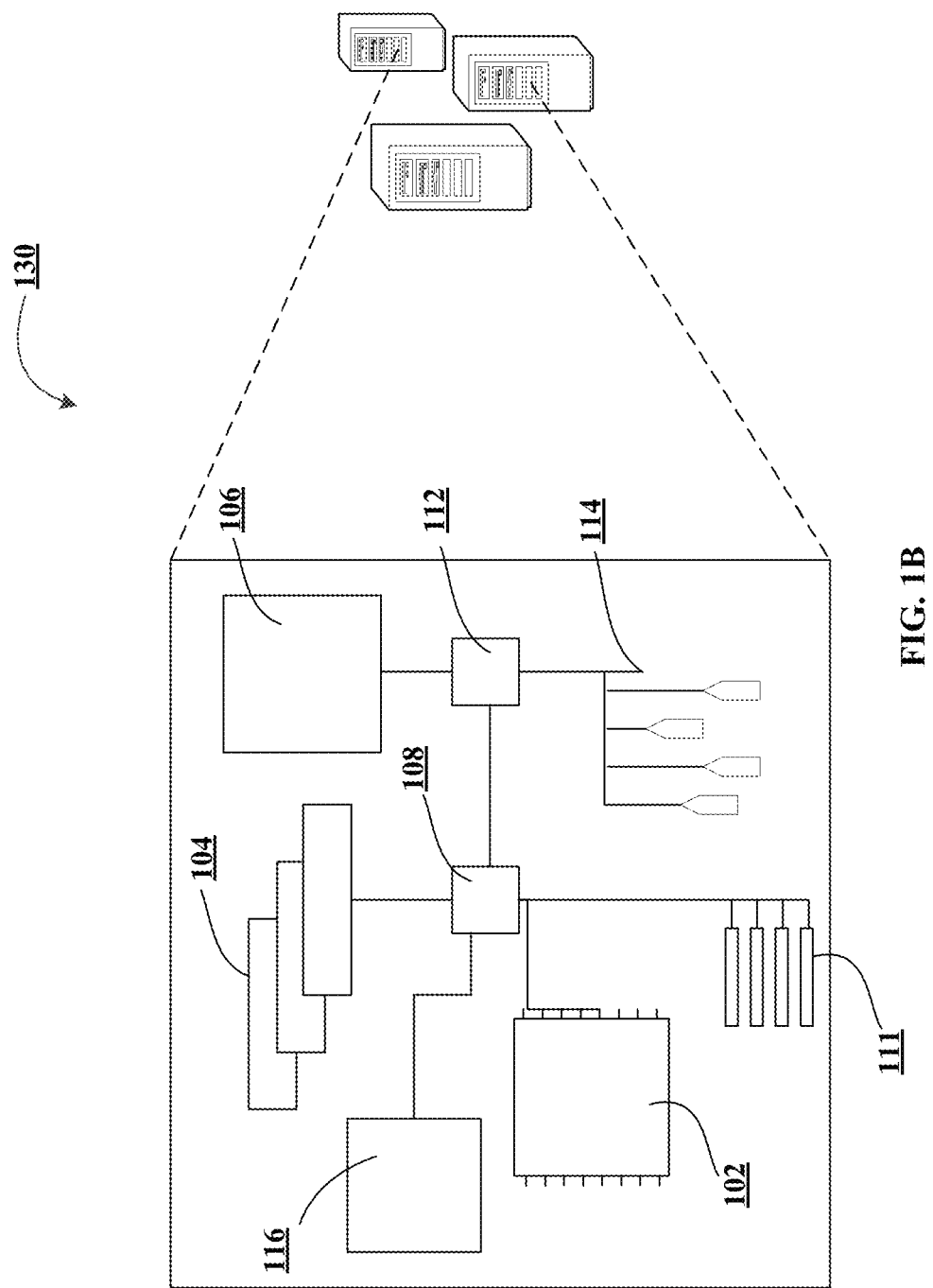
Figure 1C:
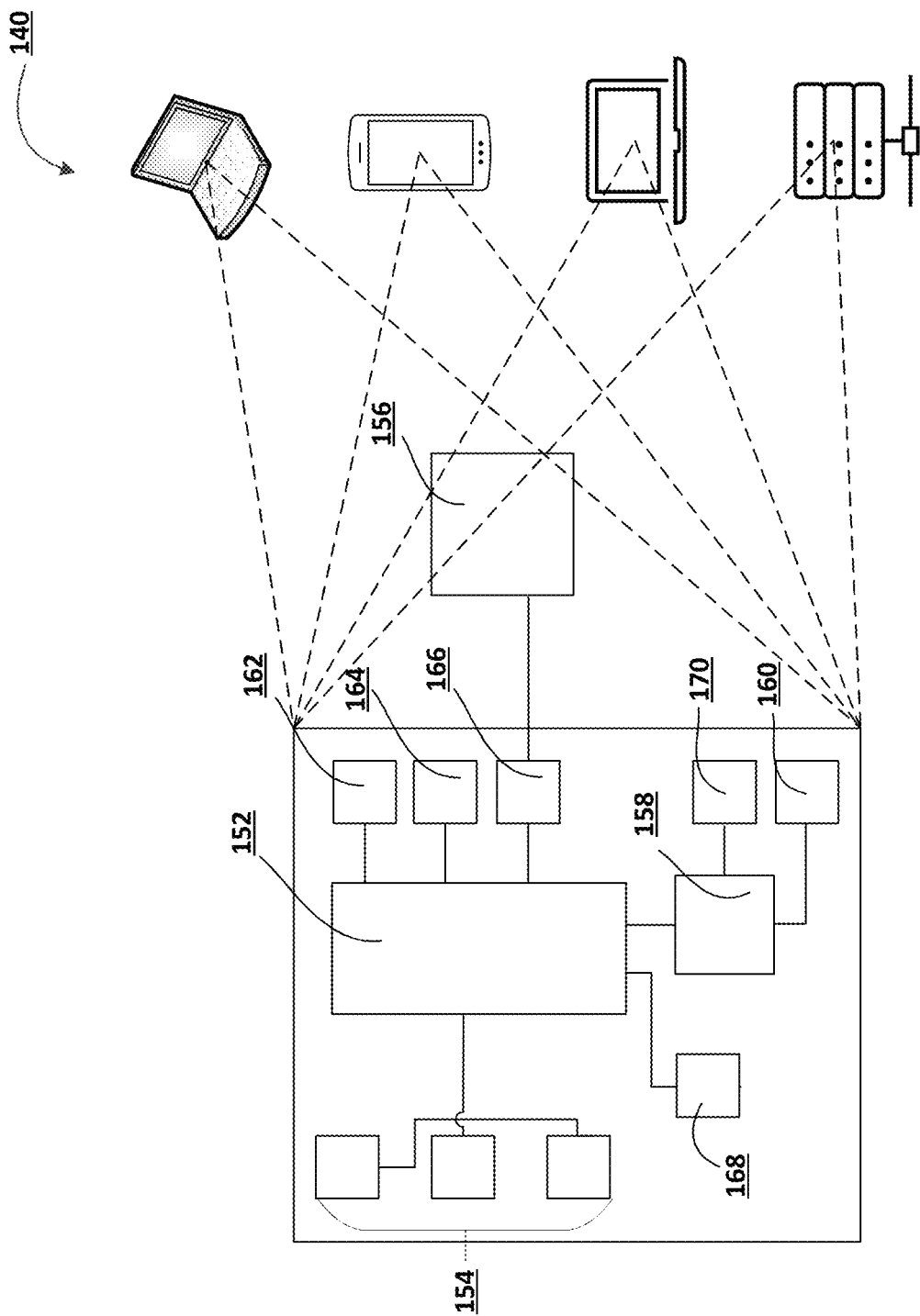
Figure 2:
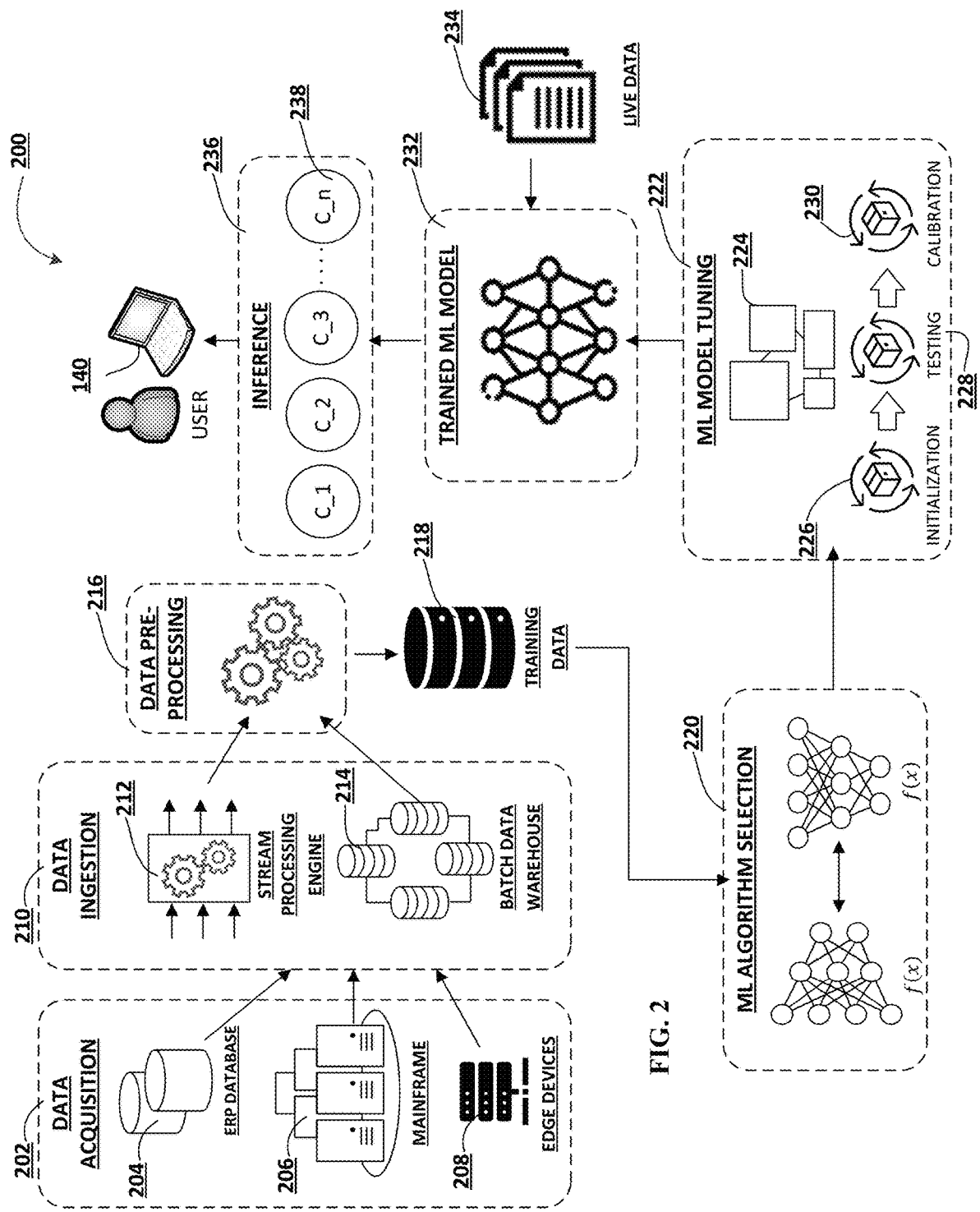
Figure 3:
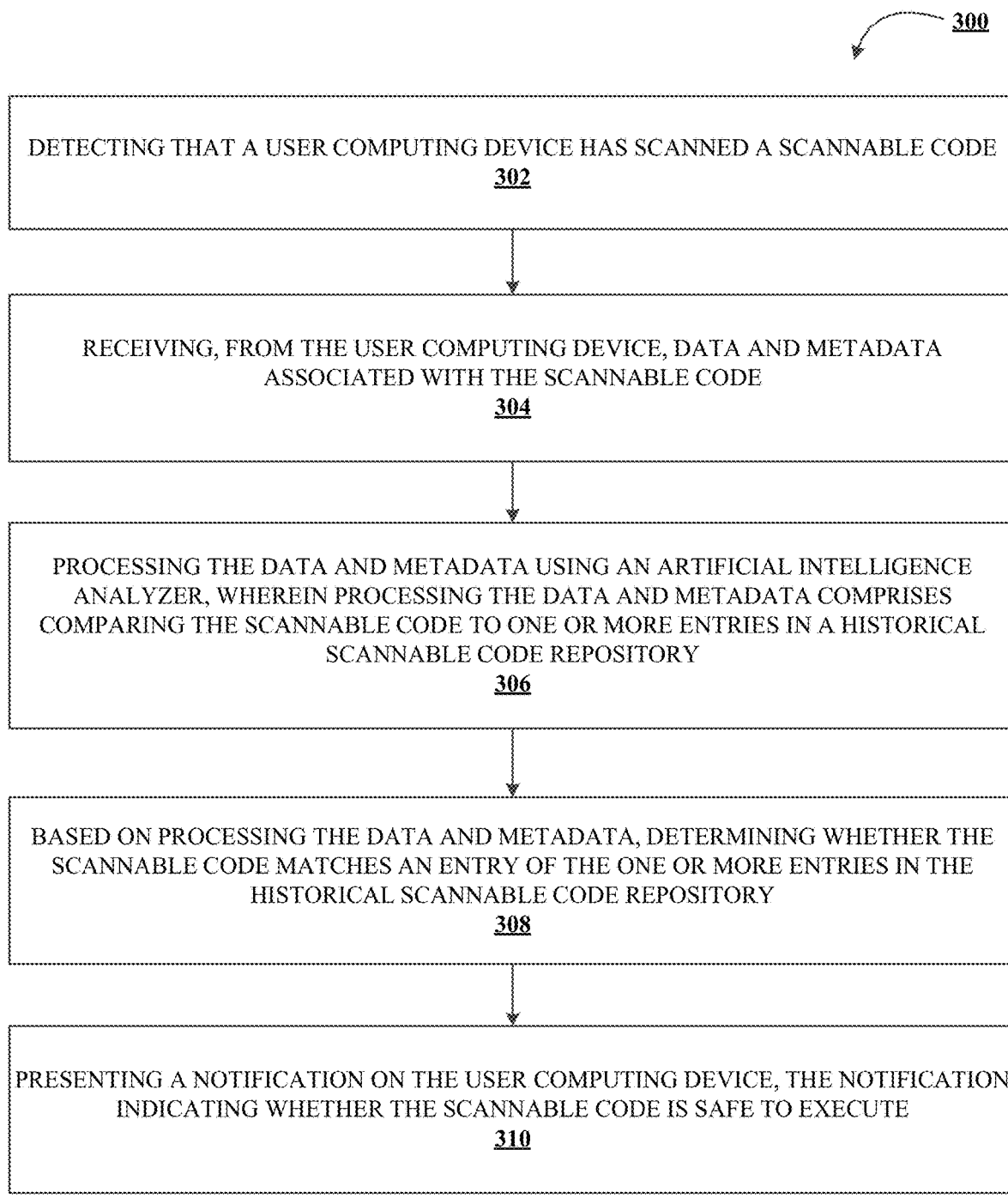

FIGS. 1A-1C illustrates technical components of an exemplary distributed computing system for detection of unauthorized computer code using an artificial intelligence-based analyzer, in accordance with an embodiment of the disclosure;

FIG. 2 illustrates an exemplary machine learning subsystem architecture, in accordance with an embodiment of the invention;

FIG. 3 illustrates a method for detection of unauthorized computer code using an artificial intelligence-based analyzer, in accordance with an embodiment of the disclosure.

DETAILED DESCRIPTION

Embodiments of the present disclosure will now be described more fully hereinafter with reference to the accompanying drawings, in which some, but not all, embodiments of the disclosure are shown. Indeed, the disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, "authentication credentials" may be any information that can be used to identify of a user. For example, a system may prompt a user to enter authentication information such as a username, a password, a personal identification number (PIN), a passcode, unique characteristic information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As used herein, "resource" may refer to a tangible or intangible object that may be used, consumed, maintained, acquired, exchanged, and/or the like by a system, entity, or user to accomplish certain objectives. Accordingly, in some embodiments, the resources may include computing resources such as processing power, memory space, network bandwidth, bus speeds, storage space, electricity, and/or the like. In other embodiments, the resources may include objects such as electronic data files or values, authentication keys (e.g., cryptographic keys), document files, funds, digital currencies, and/or the like.

"Artifact" as used herein may refer to a tangible or non-tangible object (e.g., data) that may be created and/or used as part of a validation process of a particular software release. In some embodiments, an artifact may serve as a checkpoint with respect to a particular piece of software that is being audited. In this regard, artifacts may include resources and/or links to resources such as test plans, signoffs or approvals, designs, system architecture diagrams, process flows, audit results, and/or the like. The artifacts may further include checklist items such as checks that the code of the software release conforms to formatting or syntax rules, that the production environment is deployed with the correct hardware and/or software resources (e.g., dependencies, libraries, and/or the like), that the code conforms to programming standards and/or best practices, and/or the like.

The proliferation of mobile computing devices has been accompanied by a commensurate increase in the use of scannable codes in the user's physical environment. For instance, quick-response ("QR") codes may be scanned by a user's mobile device (e.g., a smartphone) to execute certain functions, such as presenting visual and/or audio data to the user (e.g., a menu at a restaurant), opening a webpage, accessing a Uniform Resource Identifier ("URI"), transmitting messages, executing transactions or resource transfers, and/or the like. That said, the use of scannable codes may introduce security concerns from a technology perspective. For instance, a code may be created that may, upon being scanned by the user's mobile device, cause one or more undesired or unauthorized actions to occur. For instance, the scannable code may contain executable code execute functions that may compromise the security of the mobile device and/or data stored therein. In other embodiments, the scannable code may contain a URI or link to a website that executes the unauthorized code. Furthermore, the differences between a legitimate or authentic scannable code and a non-authentic scannable code may be difficult to distinguish to the human eye, which may further increase the susceptibility of the mobile device and/or the user to unknowingly executing the unauthorized code. Accordingly, there is a need to intelligently increase the security of computing devices when interacting with scannable codes.

To address the above concerns among others, the system described herein provides a way to perform intelligent detection of unauthorized scannable code using an artificial intelligence analyzer. In this regard, the system may maintain a database or repository of scanned codes that have previously been scanned by an entity's userbase (or "scanned code repository"). The scannable codes may be stored as images and/or a text or bit-based representation (e.g., a hash of the relevant bits of the scannable code) along with various types of metadata regarding the scannable code. For instance, the metadata may include information such as text associated with the scannable code, the location in which the code was scanned, an access pattern and/or scan frequency, timeframe in which the code is scanned (e.g., the code is only scanned between 9 AM and 5 PM), the type of function that is executed by the scannable code, transaction information, and/or the like.

Subsequently, the system may detect that a user's mobile device has been used to scan a scannable code (e.g., a QR code). It should be understood that though reference may be made to QR codes, it should be understood that the scope of the disclosure is applicable to other types of scannable codes (e.g., barcodes, and the like). In this regard, the system may receive image data of the scannable code (e.g., an image captured by a camera of the user's mobile device). The system may process the image data using an artificial intelligence ("AI") analyzer. The AI analyzer may use one or more AI neural networks, heuristics, and/or algorithms to perform the analysis of images of the scannable code (or "code images") and/or the various types of metadata associated with the scannable code. In some embodiments, the system may use a convolutional neural network ("CNN") and an iterative deepening depth first search ("IDDFS") algorithm to perform the AI-based functions described herein (e.g., performing a local search of the scannable code repository). In some embodiments, the system may use simulated annealing to perform a global search of the scannable code repository. For instance, the system may use an IDDFS search to identify matches between the scanned code and the codes stored in the repository by identifying the significant bits of the scanned code and performing a local search within the repository based on the scanned bits using the IDDFS algorithm. To reduce the search time, the system may further perform a global search (e.g., using the simulated annealing heuristic method) on the scannable code repository to detect a match with the scanned code.

Based on the image, the system may perform a bit-wise matrix conversion of the QR code in which the pixels of the image are analyzed and converted into a matrix of binary values (e.g., 0 or 1) based on the significant bits found within the image. The system may then compare the matrix with the data stored within the scanned code repository to determine whether the image received from the user computing device matches any of the entries within the scanned code repository. In addition to the image of the scannable code, the system may further retrieve metadata associated with the scannable code from the user computing device, such as the types of metadata described above.

If no match is detected, the system may create a new entry within the scanned code repository based on the scannable code and metadata received from the user computing device. However, if a match is found, the system may compare the metadata received from the user computing device with the metadata within the scannable code repository associated with the matching entry. If the AI analyzer determines that the scannable code and the associated metadata received from the user computing device are consistent with the entries in the scannable code repository, the system may determine that the scannable code is authorized and/or safe to execute. Subsequently, the system may transmit a notification the user computing device indicating that the scannable code is safe to execute.

However, if one or more mismatches are detected, the system may compute a confidence score associated with the scannable code, where the confidence score may be lowered for each mismatch that is detected by the system. If the confidence score falls below a designated threshold, the system may determine that the scannable code may have been compromised and is therefore unsafe or unauthorized to execute. Subsequently, the system may transmit a notification the user computing device indicating that the scannable code may not be safe to execute.

The AI algorithms may use one or more different models and/or a combination thereof to analyze the scannable codes depending on the scenario and/or characteristics of the scannable code. For instance, in some embodiments, the system may use a physical mechanism model to perform a physical comparison of the scanned code versus the codes stored in the database. In other embodiments, the system may use a data-driven model whereby the data and/or metadata associated with the scanned code is integrated and subsequently compared to the data and/or metadata within the scannable code repository (e.g., in cases in which metadata is available for comparison). In yet other embodiments, the system may use a hybrid model which may combine the physical and data driven models to varying degrees.

Based on the data and/or metadata associated with the various scannable codes, the system may perform optimization of the images and its prediction (e.g., whether the scannable code is safe to execute) based on a qualitative analysis (e.g., what types of metadata regarding the scannable code are available) as well as a quantitative analysis (e.g., how much metadata is available). The system may further perform classification of the scannable codes based on certain metadata (e.g., the entity associated with the code, the location in which the code was scanned, the transactions and/or URI's associated with the code, and/or the like). The optimizations, predictions, and/or classifications may then be stored within the scannable code repository and/or used to train the models as described herein.

An exemplary embodiment is described as follows for illustrative purposes. In one embodiment, a user may be present at an entity's premises (e.g., a store) to complete a transaction (e.g., a purchase of a good within the store). To initiate and/or execute the transaction, the user may scan a scannable code (e.g., a QR code) that may be displayed within the entity's premises using a user computing device (e.g., a mobile phone of the user). In this regard, the user may access a mobile application installed on the user computing device to scan the scannable code to initiate the transaction.

Once the scannable code has been scanned by the user computing device, the system may access the resource associated with the scannable code (e.g., the URI, text, executable code, and/or the like) and generate a timestamp for the scan of the scannable code. The user computing device may further record the location of the scannable code (e.g., by recording the GPS coordinates of the user computing device at the time of scan). In some embodiments, the system may further receive other types of metadata, such as the name of the entity, the type of transaction and/or the resource to be acquired as part of such transaction, parties to the transaction, payment methods or rails, and/or the like.

Such metadata may be received through user input (e.g., by the user inputting the information into the mobile app) and/or automatically (e.g., through external databases, historical user location data, and/or the like).

Once the data and metadata associated with the scannable code has been received by the system, the AI analyzer may compare the data and/or metadata from the scan with the information stored within the scannable code repository. If a match exists within the repository (e.g., the system has determined that the same code has been previously scanned by the userbase), the system may append an entry associated with the matching code within the scannable code repository that contains information such as the timestamp and location of the scan, along with other types of metadata as described above. On the other hand, if no match is found (e.g., the system determines that the scanned code has never been scanned by the userbase), the system may add a new entry for the newly scanned code within the scannable code repository, where the new entry comprises the data and/or metadata as described above. In this regard, an image and/or bit-based representation of the scannable code may be stored as part of the new entry.

Subsequently, the data and/or metadata regarding the scan may be processed by the AI analyzer to generate the output, where the output may indicate whether the scannable code is safe to execute. Continuing the example, the system may determine, based on comparing the scanned code to the existing data within the scannable code repository, that the scannable code is safe and authentic. For instance, the system may make the determination based on determining that the scan matches an existing entry within the database, the entity associated with the code is consistent with the location of the user computing device, the timeframe or pattern of access of the scan is consistent with prior data (e.g., the scannable code was scanned during the normal business hours of the entity), the URI is a genuine and valid link associated with the entity, the transaction details are consistent with previous scanned transaction metadata, and/ or the like. In such a scenario, the system may present a notification on the user computing device indicating that the scannable code and/or transaction is safe to execute. In this regard, the notification may comprise a visual indicator (e.g., a green icon, check mark, thumbs up icon, and/or the like) indicating that the scannable code and/or transaction is safe to execute.

On the other hand, the system may detect one or more inconsistencies between the data and metadata associated with the scanned code and the information stored in the scannable code repository. For instance, the system may detect that the location of the scanned code does not match the usual scanning location for the code, the entity name is not consistent with the code being scanned and/or the location, the code was scanned at an abnormal timeframe, pattern, or frequency (e.g., the code was scanned late at night past closing hours), the URI is inconsistent or known by the system to be an unsafe link, and/or the like. In this regard, the system may compute a confidence score based on the one or more inconsistencies, where each inconsistency may lower the confidence score by a predetermined amount. If the confidence score falls below a designated threshold, the system may determine that the scannable code is inauthentic and/or unsafe to execute. Subsequently, the system may present a notification on the user computing device indicating that the scannable code is unsafe. In this regard, the notification may comprise an indicator that indicates that the code is unsafe (e.g., a red icon, "x" mark, stop sign, and/or the like). In some embodiments, upon detecting that the scannable code is unsafe, the system may automatically block the transaction from being accessed. For example, the system may prevent the mobile app from accepting additional scans of the same scannable code for a set duration (e.g., 1 hour, 8 hours, a week, indefinitely, and/or the like).

In some embodiments, the system may determine that the transaction method specified in the scannable code is invalid or non-functional. For instance, if the system determines that the scannable code is inauthentic or unsafe, or if the resource or URI associated with the scannable code is not working, the system may automatically recommend one of various backup payment options for completing the transaction (e.g., ACH transfers, digital or crypto currency transfers, and/or the like). In such an embodiment, the system may present a notification on the user computing device indicating that the selected payment method is unavailable, where the notification may include an interactable interface for selecting the user's preferred backup method.

In some embodiments, the user dashboard of the mobile application may further include interface elements for receiving user input with respect to a particular scanned code. For instance, the dashboard may comprise a feedback form that may allow the user to provide feedback or input regarding transaction status, comments, reviews or ratings, an entity name, and/or the like. In turn, the information provided by the user may be stored in a repository to be used in later analyses of future scans.

The user dashboard of the mobile application may further include various other functions. For instance, the user dashboard may include functions to allow the user to search for entity locations and/or scannable codes (e.g., to initiate a transaction). One of the functions may include a location-based search that may display the scannable codes proximate to the user based on the location (e.g., GPS coordinates) of the user computing device. Upon the user executing the location-based search, the system may generate a list of scannable codes in the user's area, where the relative and/or absolute location of each scannable code is included in the list. The system may further list the available methods for completing transactions associated with each of the scannable codes. In some embodiments, the list may be displayed as or in addition to a viewable map in which the locations of the scannable codes are pinned to the viewable map presented on the user dashboard. In some embodiments, the system may further automatically retrieve QR codes in the area or proximity of the user based on the location of the user computing device. In this way, the system may be able to populate the results map more quickly and efficiently in response to the user query.

In some embodiments, the user dashboard may further comprise a text-based function for performing a search for a URI, entity name, and/or location of the entity. In such a scenario, the user dashboard may comprise an interface element such as a text entry field or box for entering a keyword or search term associated with the entity or transaction that the user wishes to initiate. Based on the user's input, along with other types of data (e.g., the current location of the user computing device), the system may compare the user input with the filtered results and generate a dataset for further processing. The system may then, based on the filtered results, generate a results map to be provided to the user. In yet other embodiments, the user dashboard may comprise an image-based function for performing a search, whereby the user may upload an image of a previously saved scanned QR code. Based on receiving the image, the system may perform the searches of the scannable code repository as described above to find a match.

Once a match is detected, the system may pin the location of the entity associated with the scanned code on the results map displayed on the user computing device.

The system as described herein provides a number of technological benefits over conventional scannable code systems. For instance, by using an AI-powered analyzer, the system may be able to detect not only inconsistencies in the scannable code image itself, but also the metadata or circumstances in which the code was scanned (e.g., time, location, frequency, and/or the like). This in turn decreases the likelihood that the user computing device will execute scannable code that may cause undesirable or unauthorized effects.

FIGS. 1A-1C illustrate technical components of an exemplary distributed computing environment 100 for the system for detection of unauthorized computer code using an artificial intelligence-based analyzer. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. For instance, the functions of the system 130 and the endpoint devices 140 may be performed on the same device (e.g., the endpoint device 140). Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it. In some embodiments, the system 130 may provide an application programming interface ("API") layer for communicating with the end-point device(s) 140.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as servers, networked storage drives, personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the inventions described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the invention. As shown in FIG. 1B, the system 130 may include a processor 102 (which may also be referred to herein as a "processing device"), memory 104, input/output (I/O) device 116, and a storage device 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the invention. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation- and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert it to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates an exemplary machine learning (ML) subsystem architecture 200, in accordance with an embodiment of the invention. The machine learning subsystem 200 may include a data acquisition engine 202, data ingestion engine 210, data pre-processing engine 216, ML model tuning engine 222, and inference engine 236.

The data acquisition engine 202 may identify various internal and/or external data sources to generate, test, and/or integrate new features for training the machine learning model 224. These internal and/or external data sources 204, 206, and 208 may be initial locations where the data originates or where physical information is first digitized.

The data acquisition engine 202 may identify the location of the data and describe connection characteristics for access and retrieval of data. In some embodiments, data is transported from each data source 204, 206, or 208 using any applicable network protocols, such as the File Transfer Protocol (FTP), Hyper-Text Transfer Protocol (HTTP), or any of the myriad Application Programming Interfaces (APIs) provided by websites, networked applications, and other services. In some embodiments, the these data sources 204, 206, and 208 may include Enterprise Resource Planning (ERP) databases that host data related to day-to-day business activities such as accounting, procurement, project management, exposure management, supply chain operations, and/or the like, mainframe that is often the entity's central data processing center, edge devices that may be any piece of hardware, such as sensors, actuators, gadgets, appliances, or machines, that are programmed for certain applications and can transmit data over the internet or other networks, and/or the like. The data acquired by the data acquisition engine 202 from these data sources 204, 206, and 208 may then be transported to the data ingestion engine 210 for further processing.

Depending on the nature of the data imported from the data acquisition engine 202, the data ingestion engine 210 may move the data to a destination for storage or further analysis. Typically, the data imported from the data acquisition engine 202 may be in varying formats as they come from different sources, including RDBMS, other types of databases, S3 buckets, CSVs, or from streams. Since the data comes from different places, it needs to be cleansed and transformed so that it can be analyzed together with data from other sources. At the data ingestion engine 202, the data may be ingested in real-time, using the stream processing engine 212, in batches using the batch data warehouse 214, or a combination of both. The stream processing engine 212 may be used to process continuous data stream (e.g., data from edge devices), i.e., computing on data directly as it is received, and filter the incoming data to retain specific portions that are deemed useful by aggregating, analyzing, transforming, and ingesting the data. On the other hand, the batch data warehouse 214 collects and transfers data in batches according to scheduled intervals, trigger events, or any other logical ordering.

In machine learning, the quality of data and the useful information that can be derived therefrom directly affects the ability of the machine learning model 224 to learn. The data pre-processing engine 216 may implement advanced integration and processing steps needed to prepare the data for machine learning execution. This may include modules to perform any upfront, data transformation to consolidate the data into alternate forms by changing the value, structure, or format of the data using generalization, normalization, attribute selection, and aggregation, data cleaning by filling missing values, smoothing the noisy data, resolving the inconsistency, and removing outliers, and/or any other encoding steps as needed.

In addition to improving the quality of the data, the data pre-processing engine 216 may implement feature extraction and/or selection techniques to generate training data 218. Feature extraction and/or selection is a process of dimensionality reduction by which an initial set of data is reduced to more manageable groups for processing. A characteristic of these large data sets is a large number of variables that require a lot of computing resources to process. Feature extraction and/or selection may be used to select and/or combine variables into features, effectively reducing the amount of data that must be processed, while still accurately and completely describing the original data set. Depending on the type of machine learning algorithm being used, this training data 218 may require further enrichment. For example, in supervised learning, the training data is enriched using one or more meaningful and informative labels to provide context so a machine learning model can learn from it. For example, labels might indicate whether a photo contains a bird or car, which words were uttered in an audio recording, or if an x-ray contains a tumor. Data labeling is required for a variety of use cases including computer vision, natural language processing, and speech recognition. In contrast, unsupervised learning uses unlabeled data to find patterns in the data, such as inferences or clustering of data points.

The ML model tuning engine 222 may be used to train a machine learning model 224 using the training data 218 to make predictions or decisions without explicitly being programmed to do so. The machine learning model 224 represents what was learned by the selected machine learning algorithm 220 and represents the rules, numbers, and any other algorithm-specific data structures required for classification. Selecting the right machine learning algorithm may depend on a number of different factors, such as the problem statement and the kind of output needed, type and size of the data, the available computational time, number of features and observations in the data, and/or the like. Machine learning algorithms may refer to programs (math and logic) that are configured to self-adjust and perform better as they are exposed to more data. To this extent, machine learning algorithms are capable of adjusting their own parameters, given feedback on previous performance in making prediction about a dataset.

The machine learning algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable machine learning model type. Each of these types of machine learning algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or the like.

To tune the machine learning model, the ML model tuning engine 222 may repeatedly execute cycles of experimentation 226, testing 228, and tuning 230 to optimize the performance of the machine learning algorithm 220 and refine the results in preparation for deployment of those results for consumption or decision making. To this end, the ML model tuning engine 222 may dynamically vary hyperparameters each iteration (e.g., number of trees in a tree-based algorithm or the value of alpha in a linear algorithm), run the algorithm on the data again, then compare its performance on a validation set to determine which set of hyperparameters results in the most accurate model. The accuracy of the model is the measurement used to determine which set of hyperparameters is best at identifying relationships and patterns between variables in a dataset based on the input, or training data 218. A fully trained machine learning model 232 is one whose hyperparameters are tuned and model accuracy maximized.

The trained machine learning model 232, similar to any other software application output, can be persisted to storage, file, memory, or application, or looped back into the processing component to be reprocessed. More often, the trained machine learning model 232 is deployed into an existing production environment to make practical business decisions based on live data 234. To this end, the machine learning subsystem 200 uses the inference engine 236 to make such decisions. The type of decision-making may depend upon the type of machine learning algorithm used. For example, machine learning models trained using supervised learning algorithms may be used to structure computations in terms of categorized outputs (e.g., C_1, C_2 . . . C_n 238) or observations based on defined classifications, represent possible solutions to a decision based on certain conditions, model complex relationships between inputs and outputs to find patterns in data or capture a statistical structure among variables with unknown relationships, and/or the like. On the other hand, machine learning models trained using unsupervised learning algorithms may be used to group (e.g., C_1, C_2 . . . C_n 238) live data 234 based on how similar they are to one another to solve exploratory challenges where little is known about the data, provide a description or label (e.g., C_1, C_2 . . . C_n 238) to live data 234, such as in classification, and/or the like. These categorized outputs, groups (clusters), or labels are then presented to the user input system 130. In still other cases, machine learning models that perform regression techniques may use live data 234 to predict or forecast continuous outcomes.

It will be understood that the embodiment of the machine learning subsystem 200 illustrated in FIG. 2 is exemplary and that other embodiments may vary. As another example, in some embodiments, the machine learning subsystem 200 may include more, fewer, or different components.

FIG. 3 illustrates a method 300 for detection of unauthorized computer code using an artificial intelligence-based analyzer. As shown in block 302, the method includes detecting that a user computing device has scanned a scannable code. The scannable code may be, for instance, a QR code in the user's real-world environment while the user is visiting an entity's premises (e.g., a client-facing business location). Accordingly, the scanning the scannable code may comprise capturing an image of the scannable code using an image capture device of the user computing device, which may be a portable device such as a smartphone. The user may scan the scannable code in order to execute a certain function (e.g., starting a transaction) or accessing a certain resource (e.g., an image or document presented by the entity, such as a brochure or menu). The process may be automatically initiated upon the user scanning the scannable code, such that the code validation process may be running even in the absence of direct user intervention.

Next, as shown in block 304, the method includes receiving, from the user computing device, data and metadata associated with the scannable code. When the scannable code is scanned by the user, an AI agent or application installed on the user computing device may automatically transmit the data and/or metadata associated with the scannable code to the system. In this regard, the system may receive an image of the scanned code (e.g., a photograph captured by a camera on the user's smartphone) along with various types of metadata. Such metadata may include a location of the user's computing device at the time of the scan (e.g., in the form of GPS coordinates), an entity name associated with the scanned code, a timestamp of the scan, the purpose for initiating the scan, transaction information (e.g., transferor or transferee information, resource amounts, account information, and/or the like).

Next, as shown in block 306, the method includes processing the data and metadata using an artificial intelligence analyzer, wherein processing the data and metadata comprises comparing the scannable code to one or more entries in a historical scannable code repository. In this regard, processing the data and metadata may comprise executing a bit-wise matrix conversion of the image of the scannable code using a convolutional neural network to generate a scannable code matrix, and subsequently comparing the scannable code matrix to the information stored within the scannable code repository (e.g., previously generated or historical code matrices). Alternatively or additionally, processing the data and metadata may comprise a direct pixel comparison between the image of the scannable code and images of previous scans stored in the scannable code repository.

In some embodiments, processing the data and metadata may further comprise executing a local search of the historical scannable code repository by using an iterative deepening depth first search algorithm to identify a match between the scannable code matrix and an entry of a historical code matrix within the scannable code repository. In addition to or alternative to the local search using the IDDFS algorithm, processing the data and metadata may further comprise executing a global search using a simulated annealing heuristic process to compare the metadata associated with the scanned code (e.g., location, transaction information, timestamp, and/or the like) with one or more parameters within the scannable code repository, where the parameters may include information such as a usual scan location, pattern, frequency, or timeframe for accessing the scan, transaction count, transferee name or identifier, last successful transaction, and/or the like. By using the IDDFS algorithm in conjunction with the simulated annealing process, the system may significantly shorten the time needed to return an output to the user computing device.

Next, as shown in block 308, the method includes, based on processing the data and metadata, determining whether the scannable code matches an entry of the one or more entries in the historical scannable code repository. Based on the IDDFS algorithm and/or simulated annealing process, the system may detect a match between the scanned code and an entry in the scannable code repository. If a match is detected, the system may tag the timestamp and location associated with the recognized scanned code to be appended to the existing data record for the scanned code in the scannable code repository. If no match is detected, the system may create a new entry in the scannable code repository based on the scannable code.

In some embodiments, processing the data and metadata may further comprise computing a confidence score associated with the scannable code, where the confidence score indicates the degree of safety associated with the scannable code. The confidence score may be progressively decreased based on a number of factors as identified by the system during the analysis, where such factors may include mismatches in the usual location of the scannable code, unusual access patterns, frequencies, or timeframes, blocklisted URL's within the scannable code, the absence of a match between the scannable code and an entry in the scannable code repository, faulty transaction information, and/or the like. In some embodiments, certain factors may be weighted more greatly by the system than others. For example, a mismatch in the usual location of the scannable code may be assigned a lower weight than the presence of a blocklisted URL (e.g., a URL previously identified by the system to contain unauthorized or malicious code).

If the confidence score associated with the scannable code meets or exceeds a defined threshold, the system may determine that the scannable code is safe to scan and/or execute. On the other hand, if the confidence score falls below a defined threshold, the system may determine that the scannable code is potentially unsafe to scan and/or execute. In some embodiments, the system may further automatically block the user computing device from executing the scannable code. For instance, if the scannable code contains a link to a URL, the system may prevent the browser of the user computing device from accessing the URL. In embodiments in which the scannable code executes a transaction, the system may block the transaction from being executed (e.g., by preventing the user computing device from processing or finalizing the transaction). Subsequently, the system may append the outcome of the analysis to the entry associated with the scannable code within the scannable code repository. In turn, the outcome data may be used to train and/or fine-tune the algorithms and/or models described herein, thereby increasing the accuracy of the analysis over time.

Next, as shown in block 310, the method includes presenting a notification on the user computing device, the notification indicating whether the scannable code is safe to execute. The notification may be presented on a user dashboard presented on a display device of the user computing device. If the system determines that the scannable code is safe to execute, the notification may comprise a visual indicator that the scannable code is safe to execute (e.g., a green check mark). On the other hand, if the system determines that the scannable code is unsafe to execute, the notification may comprise a visual indicator that the scannable code is unsafe to execute (e.g., a red "x" mark). In this way, the system provides an efficient and secure way to verify the safety of scannable codes within the user's environment.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), as a computer program product (including firmware, resident software, microcode, and the like), or as any combination of the foregoing. Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for detection of unauthorized computer code using an artificial intelligence-based analyzer, wherein the system is structured for processing a scannable code image, detecting inconsistent metadata, and preventing execution of unauthorized code to prevent compromise of the security of a user computing device, the system comprising:
    a processing device;
    a non-transitory storage device containing instructions when executed by the processing device, causes the processing device to perform the steps of:
    detecting that the user computing device has scanned a scannable code via an image capture device of the user computing device;
    receiving, from the user computing device, image data associated with the scannable code;
    extract metadata associated with the scannable code from the user computing device, wherein extracting the metadata comprises:
    accessing a Uniform Resource Identifier or text executable code associated with the scannable code;
    wherein the metadata comprises text associated with the scannable code, location where the user computing device scanned the scannable code, access pattern, scan frequency, a timestamp indicating when the user computing device scanned the scannable code and/or type of function executed by the scannable code;
    processing the image data and metadata using an artificial intelligence analyzer, wherein processing the data and metadata comprises comparing the scannable code to one or more entries in a historical scannable code repository, wherein processing the image data and the metadata further comprises:
    converting pixels of the image data into a matrix of binary values based on predetermined significant bits in the image data;
    based on processing the image data and metadata, determining whether the scannable code matches an entry of the one or more entries in the historical scannable code repository;
    in response to detecting one or more inconsistencies between the metadata associated with the scannable code and metadata associated with an entry of the one or more entries of the historical scannable code repository:
    determining that the scannable code is unauthentic and unsafe to execute;
    automatically blocking a processing activity associated with the scanning of the scannable code at the user computing device; and
    preventing an application at the user computing device from accepting additional scans of the scannable code for a predetermined duration;
    determining that the scannable code is safe to execute; and
    presenting a notification on the user computing device, the notification indicating whether the scannable code is safe to execute, and wherein the notification comprises a visual indicator indicating that the scannable code is safe to execute.

2. The system of claim 1, wherein processing the data and metadata further comprises:
    converting the pixels of the image data into the matrix of binary values by executing a bit-wise matrix conversion of the scannable code using a convolutional neural network to generate a scannable code matrix; and
    executing a local search of the historical scannable code repository based on the scannable code matrix using an iterative deepening depth first search algorithm;
    wherein each of the one or more entries in the historical scannable code repository is associated with a historical scanned code, wherein each historical scanned code is stored as a hash of predetermined relevant bits and metadata associated with the historically scanned code.

3. The system of claim 2, wherein processing the data and metadata further comprises:
    identifying one or more parameters from the metadata; and
    executing a global search of the historical scannable code repository based on the one or more parameters using a simulated annealing process.

4. The system of claim 3, wherein the non-transitory storage device further contains instructions which when executed by the processing device cause the processing device to:
    optimize the scannable code based on (i) the types of metadata associated with the scannable code, and (ii) the quantity of metadata associated with the scannable code; and
    classify the scannable code based on the types of metadata associated with the scannable code.

5. The system of claim 1, wherein processing the data and metadata further comprises computing a confidence score associated with the scannable code, wherein the confidence score is computed based on one or more factors, the one or more factors comprising at least one of a usual location associated with the scannable code, an entity name or identifier associated with the scannable code, and an access frequency or pattern associated with the scannable code.

6. The system of claim 1, wherein the non-transitory storage device further contains instructions which when executed by the processing device cause the processing device to:
    determine a geographic location associated with the user computing device;
    determine a plurality of additional scannable codes within a predetermined proximity of the geographic location; and
    construct a display of a viewable map at a user dashboard of the user computing device such that locations of the plurality of additional scannable codes are pinned to viewable map.

7. A computer program product for detection of unauthorized computer code using an artificial intelligence-based analyzer, wherein the computer program product is structured for processing a scannable code image, detecting inconsistent metadata, and preventing execution of unauthorized code to prevent compromise of the security of a user computing device, the computer program product comprising a non-transitory computer-readable medium comprising code causing an apparatus to perform the steps of:
   detecting that the user computing device has scanned a scannable code via an image capture device of the user computing device;
   receiving, from the user computing device, image data associated with the scannable code;
   extract metadata associated with the scannable code from the user computing device, wherein extracting the metadata comprises:
   accessing a Uniform Resource Identifier or text executable code associated with the scannable code;
   wherein the metadata comprises text associated with the scannable code, location where the user computing device scanned the scannable code, access pattern, scan frequency, a timestamp indicating when the user computing device scanned the scannable code and/or type of function executed by the scannable code;
   processing the image data and metadata using an artificial intelligence analyzer, wherein processing the data and metadata comprises comparing the scannable code to one or more entries in a historical scannable code repository, wherein processing the image data and the metadata further comprises:
   converting pixels of the image data into a matrix of binary values based on predetermined significant bits in the image data;
   based on processing the image data and metadata, determining whether the scannable code matches an entry of the one or more entries in the historical scannable code repository;
   in response to detecting one or more inconsistencies between the metadata associated with the scannable code and metadata associated with an entry of the one or more entries of the historical scannable code repository:
   determining that the scannable code is unauthentic and unsafe to execute;
   automatically blocking a processing activity associated with the scanning of the scannable code at the user computing device; and
   preventing an application at the user computing device from accepting additional scans of the scannable code for a predetermined duration;
   determining that the scannable code is safe to execute; and
   presenting a notification on the user computing device, the notification indicating whether the scannable code is safe to execute, and wherein the notification comprises a visual indicator indicating that the scannable code is safe to execute.

8. The computer program product of claim 7, wherein processing the data and metadata further comprises:
   converting the pixels of the image data into the matrix of binary values by executing a bit-wise matrix conversion of the scannable code using a convolutional neural network to generate a scannable code matrix; and
   executing a local search of the historical scannable code repository based on the scannable code matrix using an iterative deepening depth first search algorithm;
   wherein each of the one or more entries in the historical scannable code repository is associated with a historical scanned code, wherein each historical scanned code is stored as a hash of predetermined relevant bits and metadata associated with the historically scanned code.

9. The computer program product of claim 8, wherein processing the data and metadata further comprises:
   identifying one or more parameters from the metadata; and
   executing a global search of the historical scannable code repository based on the one or more parameters using a simulated annealing process.

10. The computer program product of claim 9, wherein the computer program product further comprises code causing the apparatus to perform the steps of:
    optimizing the scannable code based on (i) the types of metadata associated with the scannable code, and (ii) the quantity of metadata associated with the scannable code; and
    classifying the scannable code based on the types of metadata associated with the scannable code.

11. The computer program product of claim 7, wherein processing the data and metadata further comprises computing a confidence score associated with the scannable code, wherein the confidence score is computed based on one or more factors, the one or more factors comprising at least one of a usual location associated with the scannable code, an entity name or identifier associated with the scannable code, and an access frequency or pattern associated with the scannable code.

12. The computer program product of claim 7, wherein the computer program product further comprises code causing the apparatus to perform the steps of:
    determining a geographic location associated with the user computing device;
    determining a plurality of additional scannable codes within a predetermined proximity of the geographic location; and
    constructing a display of a viewable map at a user dashboard of the user computing device such that locations of the plurality of additional scannable codes are pinned to viewable map.

13. A computer-implemented method for detection of unauthorized computer code using an artificial intelligence-based analyzer, wherein the computer-implemented method is structured for processing a scannable code image, detecting inconsistent metadata, and preventing execution of unauthorized code to prevent compromise of the security of a user computing device, the computer-implemented method comprising:
    detecting that the user computing device has scanned a scannable code via an image capture device of the user computing device;
    receiving, from the user computing device, image data and metadata associated with the scannable code;
    extract metadata associated with the scannable code from the user computing device, wherein extracting the metadata comprises:
    accessing a Uniform Resource Identifier or text executable code associated with the scannable code;
    wherein the metadata comprises text associated with the scannable code, location where the user computing device scanned the scannable code, access pattern, scan frequency, a timestamp indicating when the user computing device scanned the scannable code and/or type of function executed by the scannable code;

processing the image data and metadata using an artificial intelligence analyzer, wherein processing the data and metadata comprises comparing the scannable code to one or more entries in a historical scannable code repository, wherein processing the image data and the metadata further comprises:

converting pixels of the image data into a matrix of binary values based on predetermined significant bits in the image data;

based on processing the image data and metadata, determining whether the scannable code matches an entry of the one or more entries in the historical scannable code repository;

in response to detecting one or more inconsistencies between the metadata associated with the scannable code and metadata associated with an entry of the one or more entries of the historical scannable code repository:

determining that the scannable code is unauthentic and unsafe to execute;

automatically blocking a processing activity associated with the scanning of the scannable code at the user computing device; and preventing an application at the user computing device from accepting additional scans of the scannable code for a predetermined duration;

determining that the scannable code is safe to execute; and presenting a notification on the user computing device, the notification indicating whether the scannable code is safe to execute, and wherein the notification comprises a visual indicator indicating that the scannable code is safe to execute.

14. The computer-implemented method of claim 13, wherein processing the data and metadata further comprises:

converting the pixels of the image data into the matrix of binary values by executing a bit-wise matrix conversion of the scannable code using a convolutional neural network to generate a scannable code matrix; and executing a local search of the historical scannable code repository based on the scannable code matrix using an iterative deepening depth first search algorithm;

wherein each of the one or more entries in the historical scannable code repository is associated with a historical scanned code, wherein each historical scanned code is stored as a hash of predetermined relevant bits and metadata associated with the historically scanned code.

15. The computer-implemented method of claim 14, wherein processing the data and metadata further comprises:

identifying one or more parameters from the metadata; and executing a global search of the historical scannable code repository based on the one or more parameters using a simulated annealing process.

16. The computer-implemented method of claim 15, wherein the computer-implemented method further comprises:

optimizing the scannable code based on (i) the types of metadata associated with the scannable code, and (ii) the quantity of metadata associated with the scannable code; and classifying the scannable code based on the types of metadata associated with the scannable code.

17. The computer-implemented method of claim 13, wherein processing the data and metadata further comprises computing a confidence score associated with the scannable code, wherein the confidence score is computed based on one or more factors, the one or more factors comprising at least one of a usual location associated with the scannable code, an entity name or identifier associated with the scannable code, and an access frequency or pattern associated with the scannable code.

18. The computer-implemented method of claim 13, wherein the computer-implemented method further comprises:

determining a geographic location associated with the user computing device;

determining a plurality of additional scannable codes within a predetermined proximity of the geographic location; and constructing a display of a viewable map at a user dashboard of the user computing device such that locations of the plurality of additional scannable codes are pinned to viewable map.

* * * * *